(12) United States Patent
Lee et al.

(10) Patent No.: US 10,986,329 B2
(45) Date of Patent: Apr. 20, 2021

(54) AUTOSTEREOSCOPIC 3-DIMENSIONAL DISPLAY

(71) Applicant: LG DISPLAY CO., LTD., Seoul (KR)

(72) Inventors: Byungjoo Lee, Seoul (KR); Seounguk Heo, Paju-si (KR); Juhoon Jang, Paju-si (KR); Youyong Jin, Seoul (KR); Wonsik Lee, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 413 days.

(21) Appl. No.: 15/639,696

(22) Filed: Jun. 30, 2017

(65) Prior Publication Data

US 2018/0007349 A1    Jan. 4, 2018

(30) Foreign Application Priority Data

Jun. 30, 2016    (KR) .................... 10-2016-0083086

(51) Int. Cl.
    *G02B 30/22*        (2020.01)
    *H04N 13/305*       (2018.01)
    (Continued)

(52) U.S. Cl.
    CPC ........... *H04N 13/305* (2018.05); *G02B 30/27* (2020.01); *H04N 13/317* (2018.05); *H04N 13/398* (2018.05); *H04N 2213/001* (2013.01)

(58) Field of Classification Search
    CPC ..... H04N 13/04; H04N 13/0404–0406; H04N 13/0409; H04N 13/0497; H04N 13/0239; H04N 13/0055; H04N 13/0296; H04N 13/0431; H04N 13/0242; H04N 13/0048; H04N 13/021; H04N 13/0221; H04N 13/0037; H04N 13/0051; H04N 13/044; H04N 13/0438; H04N 13/0003; H04N 13/0422; H04N 13/0434; H04N 13/0459; H04N 13/305; H04N 13/317;
    (Continued)

(56) References Cited

U.S. PATENT DOCUMENTS

2006/0139503 A1* 6/2006 Larson .............. G02F 1/133512
                                                        349/39
2008/0316379 A1* 12/2008 Zuidema ............. H04N 13/305
                                                        349/15
(Continued)

FOREIGN PATENT DOCUMENTS

JP    2014160282 A  *  4/2014  ............. G02B 27/22
JP    2014-160282 A     9/2014
(Continued)

*Primary Examiner* — Jade R Chwasz
*Assistant Examiner* — Jyotsna V Dabbi
(74) *Attorney, Agent, or Firm* — Birch, Stewart, Kolasch & Birch, LLP

(57) ABSTRACT

Discussed is an autostereoscopic three-dimensional (3D) display including: a display panel having a plurality of pixels and an aperture area disposed at each pixel; a lens film disposed on a front surface of the display panel and having a plurality of lenticular lens, the lenticular lenses having a slanted angle and continuously arrayed in a lateral direction, and the aperture area having at least two sub-aperture areas; a central black strip disposed between two sub-aperture areas; and side black strips disposed at a left, side and a right side of the aperture area, respectively.

19 Claims, 13 Drawing Sheets

(51) Int. Cl.
*H04N 13/317* (2018.01)
*G02B 30/27* (2020.01)
*H04N 13/398* (2018.01)

(58) Field of Classification Search
CPC ...... H04N 13/398; H04N 13/00; H04N 13/51;
H04N 9/3197; H04N 9/3105; H04N
2213/001; G02B 27/22; G02B 27/2214;
G02B 27/2228; G02B 27/2257; G02B
27/2235; G02B 27/225; G02B 27/2264;
G02B 27/017; G02B 27/26; G03B
35/00–12; G03B 35/20; G03B 31/06;
G03B 31/00
USPC .......................................................... 359/463
See application file for complete search history.

(56) References Cited

U.S. PATENT DOCUMENTS

| | | | | |
|---|---|---|---|---|
| 2014/0340746 | A1* | 11/2014 | Watanabe | G02B 27/2214 359/464 |
| 2015/0130916 | A1* | 5/2015 | Hamagishi | H04N 13/324 348/59 |
| 2015/0341623 | A1* | 11/2015 | Kim | H04N 13/305 348/59 |

FOREIGN PATENT DOCUMENTS

| | | | | |
|---|---|---|---|---|
| KR | 10-2015-0136228 A | 12/2015 | | |
| WO | WO-2015000645 A1 * | 1/2015 | ........... | H04N 13/398 |

\* cited by examiner

AUTOSTEREOSCOPIC 3-DIMENSIONAL DISPLAY

CROSS-REFERENCE TO RELATED APPLICATIONS

This application claims the priority benefit of the Korea Patent Application No. 10-2016-0083086 filed on Jun. 30, 2016, which is hereby incorporated herein by reference for all purposes as if fully set forth herein.

BACKGROUND

Technical Field

The present disclosure relates to an autostereoscopic three-dimensional (3D) display in which a multi view structure is configured by using a lenticular lens (hereinafter referred to as a 'lenticular lens type'). In particular, the present disclosure relates to a lenticular lens type autostereoscopic 3D display that maintains a luminance deviation between view areas constant irrespective of an error in the manufacturing process and provides a high quality stereoscopic image.

Description of the Related Art

Due to the development of stereoscopic image display technology, a stereoscopic image reproducing technique has been applied to a display device such as a television or monitor, so that anyone can enjoy stereoscopic (or 3D) images anywhere. A stereoscopic image display may be defined as a system for artificially reproducing a stereoscopic image.

The reason why a person feels visually stereoscopic is because of binocular disparity, which is caused by the fact that the human eyes are 65 mm apart in the horizontal direction. Even if the human eyes look at the same object, because of binocular parallax, the human eyes look at the same object from a slightly different angle. As these two images are sent to the brain through the retina, the brain can recognize the stereoscopic image by precisely combining these two images.

The autostereoscopic 3D display generates a virtual stereoscopic effect through a design that displays both the left eye image and the right eye image in the two-dimensional display according to the mechanism of the binocular disparity, and sends them to the left eye and the right eye, respectively. As a method for realizing the binocular parallax, a spectacle type (or, glasses type) display and a non-spectacle type (or, non-glasses type) display have been developed.

The spectacle type display is divided into a time division system and a space division system. In the time division system, the left eye image and the right eye image are sequentially displayed with a time lag, and the shutter glasses or the polarizing glasses are used to provide a stereoscopic image. In the space division system, the left eye image and the right eye image are displayed at the same time, but each of them are provided with the different polarized light, respectively. The stereoscopic images are provided using the polarized glasses or the shutter glasses in the space division system.

In the non-spectacle type display (or, 'autostereoscopic 3D display'), the left eye image and the right eye image are displayed at the same time, and the optical axes of these two images are separated from each other. These images are provided to the left eye and the right eye, respectively. The non-spectacle type display may be divided into the parallax barrier system, the lenticular lens system and the integral photography system. In the parallax barrier system, a vertical grid-like aperture is disposed on the front of the display to separate the left eye image and the right eye image. In the lenticular lens system, a lens film in which a plurality of semi-cylindrical lenses are continuously arrayed is attached to a front surface of the display to provide the left eye image and the right eye image. The integral photography system uses a dragonfly-eye-shaped lens plate to separate the left eye image and the right eye image.

FIG. 1 is a schematic diagram illustrating the autostereoscopic 3D display according to the related art. Referring to FIG. 1, the autostereoscopic 3D display comprises a display panel 100, a display panel driver 130, a 3D cell driver 210, a timing controller 101 and so on.

The display panel 100 may be a flat panel display such as a liquid crystal display ('LCD'), a field emission display ('FED'), a plasma display panel ('PDP'), an organic light emitting diode display (OLED) and so on. The display panel 100 may include a plurality of data lines 105 and a plurality of gate lines (or, scan lines) 106, which are crossing each other. At each of the areas defined in a mattress manner by the crossing structure of the data lines 105 and the gate lines 106, a pixel PXL is placed, respectively. Each pixel may include a plurality of sub pixels having different colors. The display panel 100 represents two-dimensional (2D) images at the 2D mode, and the left eye image and the right eye image at the 3D mode.

The display panel driver 130 may include a data driving circuit 102 and a gate driving circuit 103. The data driving circuit 102 supplies 2D image data voltages or 3D image data voltages to the data lines 105. The gate driving circuit 103 sequentially supplies a gate pulse (or, scan pulse) to the gate lines 106. In the 3D mode, the display panel driver 130 may supply the left eye image data and the right eye image data to the pixels of the display panel 100 by separating them using the space divisional method.

The data driving circuit 102 may convert digital video data received from the timing controller 101 into analog gamma voltages to generate data voltages, and then supply the data voltages to the data line 105. The gate driving circuit 103 may supply a gate pulse to the gate lines 106 by the timing controller 101, wherein the gate pulse is a signal for synchronizing with the data voltages for supplying the data voltages to the data lines 105. The gate pulse is sequentially supplied to the gate lines 106.

The timing controller 101 supplies digital video data RGB of 2D/3D input images from the host system 110 to the data driving circuit 102. With the digital video data RGB, the timing controller 101 receives timing signals from the host system 110 such as a vertical synchronizing signal, a horizontal synchronizing signal, a data enable signal, and a main clock. Using the timing signals received from the host system 110, the timing controller 101 controls each operating timings of the display panel driver 130 and the 3D cell driver 210, and generates timing control signals (DDC, GDC and 3DC) for synchronizing the operating timing of the drivers.

The 3D data formatter 120 may be disposed between the host system 110 and the timing controller 101. In the 3D mode, the 3D data formatter 120 rearranges left eye image data and right eye image data of the 3D images received from the host system 110 into a predetermined data format, and transmits the rearranged left eye image data and right eye image data to the timing controller 101.

The host system 110 may be implemented as one of a television set, a set-top box, a navigation system, a DVD player, a blue-ray player, a personal computer, a home theater system or a smart phone system. Using a scaler, the host system 110 may convert digital video data of the 2D/3D input image into a format that matches the resolution of the display panel 100, and then transmits the converted digital video data, along with the timing signals to the timing controller 101.

The host system 110 supplies 2D images to the timing controller 101 in 2D mode, while the host system 110 supplies 3D image data or 2D image data to the 3D data formatter 120 in the 3D mode. Responding to the user's data entered via the user interface 112, the host system 110 sends all signals to the timing controller 101 to switch the operating mode of the non-spectacular stereoscopic display between the 2D mode and the 3D mode. The user interface 112 may be implemented as one of a key pad, a keyboard, a mouse, an on-screen display (or 'OSD'), a remote controller, a graphic user interface, a touch user interface, a voice recognizing user interface, a 3D user interface, and so on.

The 3D cell 200 may include a lenticular lens or a switchable lens. For the case of the lenticular lens, the 3D cell 200 having a plurality of lenticular lens is disposed on the front surface of the display panel 100. The n-view images including the first view image to the nth view image are provided to the n-view areas including the first view area to the nth view area, respectively. The 3D cell 200 represents the k-th view image displayed on the display panel 100 to the k-th view area.

Further, lenticular lenses of the 3D cell 200 may be arranged in a slanted type or in a vertical type. In the slanted type, the lenticular lenses are arranged obliquely at a predetermined angle with respect to the pixels of the display panel 100. In the vertical type, the lenticular lenses are arranged in a direction perpendicular to the pixels of the display panel 100.

When the 3D cell 200 is implemented as a switchable lens, a 3D cell driver 210 is required for driving the 3D cell 200. In this case, the 3D cell driver 210 controls the optical separation of the 3D cell 200 by supplying a driving voltage to the 3D cell 200.

FIG. 2 illustrates a lenticular lens type autostereoscopic 3D display according to the related art. Specifically, FIG. 2 is a plan view illustrating the structure of a lenticular lens type autostereoscopic 3D display according to the related art. FIG. 2 shows a case in which the autostereoscopic 3D display includes 7 view areas separated each other by the lenticular lens that is attached on the display panel with a ⅓ delta design.

Referring to FIG. 2, the lenticular type autostereoscopic 3D display according to the related art comprises a display panel 100 and a lens film LF disposed on the front surface of the display panel 100. The display panel 100 includes a plurality of pixels PXL arrayed in a matrix manner. At each pixel PXL, an aperture area AP is defined. The aperture area AP is the area for representing the color and brightness allocated at the pixel PXL. For example, the aperture area AP may be defined as the area representing any one color of the red color R, the green color G and the blue color B. Other areas of the display panel 100 excepting the aperture area AP are covered by the black matrix.

The display panel 100 may be a flat display panel such as the liquid crystal display panel or the organic light emitting diode display panel. The display panel 100 may further include various elements such as a gate line, a data line, a thin film transistor and so on, as well as the pixel PXL. Here, for the sake of convenience, the detailed description of the specific configurations of these elements of the display panel 100 is omitted.

The lens film LF includes a plurality of lenticular lenses SLN arranged with a predetermined width. For example, a plurality of semi-cylindrical lenticular lenses are continuously arrayed or arranged. Further, the lenticular lens SLN is slanted at a predetermined angle. Here, the slanted (or inclined) angle of the lenticular lens SLN is determined by the 'delta' value.

For the case of ⅓ delta structure as shown in FIG. 2, the pixels for the same view area are assigned at every one pixel in the horizontal direction and at every three pixels in the vertical direction. Under this condition, as the width of one lenticular lens SLN is covering to the width of three pixels PXL, one lenticular lens SLN has seven view areas V1 to V7 separated each other. The pixels allocated at any one view area V1 to V7 represent one kind of view image. The number written at each aperture area AP means the kind of the view area V1 to V7 allocated at the aperture area AP.

As shown in FIG. 2, the first view image is displayed on the aperture areas AP allocated to the first view area V1. The second view image is displayed on the aperture areas AP allocated to the second view area V2. In this manner, the k-th view image is displayed on the aperture areas AP allocated to the k-th view area Vk. Here, 'k' is an integer and is one of 1 to 7.

At the position of the optimal viewing distance, each view area provides an image to the view area separated from other view areas by the lenticular lens (SLN). When a viewer is positioned at the optimal viewing distance, the left eye and the right eye will see different view images, respectively. These different view images are the left eye image and the right eye image generated by the binocular disparity. Then the stereoscopic image can be viewed by the combination of these images. A more detailed description will be given with reference to FIGS. 3A and 3B. FIGS. 3A and 3B are schematic diagrams illustrating a mechanism for displaying an object OBJ as a stereoscopic image.

Referring to FIG. 3A, different images are seen according to the direction in which the object OBJ is observed. The stereoscopic image of the object is divided into the seven view areas (multi-view area) composed of V1 to V7. The image seen in the k-th view area is referred to as Mk. Here, k is an integer among 1 to 7. That is, the first image M1 is observed (or displayed) at the first view area V1, the second image M2 is observed at the second view area V2, the third image M3 is observed at the third view area V3, and the seventh image M7 is observed at the seventh view area V7.

When the left eye of the observer is located at the first view area V1 and the right eye of the observer is located at the second view area V2, the left eye recognizes the first image M1 and the right eye recognizes the second image M2. Then by combining this binocular disparity, the observer's brain perceives the object OBJ stereoscopically.

Referring to FIG. 3B, the lenticular lens type autostereoscopic 3D display realizes the stereoscopic effect or mechanism using a flat panel display. In the flat panel display shown in FIG. 2, the seven view areas are separated by the lenticular lens SLN, and the pixels PXL allocated at each view area display the image associated to each view area.

As shown in FIG. 3B, each of the seven images M1 to M7 are provided to each of the seven view areas V1 to V7 separated by the lenticular lens SLN, respectively. When a viewer observes the display at the position L1, the left eye is located at the first view area V1 and the right eye is located at the second view area V2. Then, the viewer can enjoy the same stereoscopic feeling as that of looking the object OBJ at the position L1 in FIG. 3A. When the viewer moves to the position L4, the left eye L is located at the fourth view area V4 and the right eye R is located at the fifth view area V5. Then, the viewer can enjoy the same stereoscopic feeling as that of looking the object OBJ at the position L4 in FIG. 3A.

Referring again to FIG. 2, in the lenticular lens type autostereoscopic 3D display, the aperture area AP has a parallelogram shape that is inclined in parallel to the tilted (or slanted) angle of the lenticular lens SLN. In addition, the horizontal width of the parallelogram is formed to be equal to the width of one viewing area Vk defined in the lenticular lens SLN. This is so that only the allocated pixels PXL are arranged to each view area. For example, in the first view area V1, only the aperture areas AP (having assigned number 1) of the pixels allocated thereto are arranged. It is preferable that the aperture area AP (having assigned number 2) allocated to the neighboring second view area V2 is not overlapped with the first view area V1.

By having such a structure, it is possible to prevent 3D crosstalk from occurring due to no overlapping of images between respective view areas. However, in the process of manufacturing a display panel having such a structure, luminance unevenness may occur due to the manufacturing process tolerance. Hereinafter, referring to FIGS. 4A and 4C, a description on the luminance variation due to the luminance unevenness at each view area will be given. FIGS. 4A to 4C are schematic diagrams for explaining the occurrence of a luminance variation in a lenticular lens type autostereoscopic 3D display according to the related art.

FIG. 4A shows a structure in which the aperture areas AP 1-7 are accurately arranged for each view area. This is the case in which no process error occurs in the manufacturing process, and the aperture areas AP 1-7 are formed so as to coincide with the corresponding view areas V1-V7, so that it is the ideal case. However, in the actual manufacturing process, due to the manufacturing process tolerances, the aperture areas AP are not accurately placed in the view areas.

For example, as shown in FIG. 4B, the line width of the aperture area AP may be reduced due to the manufacturing process tolerance (or, process margin). Then, a gap occurs between two neighboring aperture areas AP disposed in neighboring view areas. As the results, dark regions are generated between any one view area and neighboring view area, and luminance unevenness occurs in which the luminance suddenly decreases at the boundary portion.

On the other hand, as shown in FIG. 4C, when the line width of the aperture area AP increases due to a manufacturing process tolerance, an area OVP in which two neighboring aperture areas AP disposed in neighboring view areas overlap each other is generated. In this overlapping area, luminance unevenness occurs in which the luminance rapidly increases. In addition, in the overlapping area OVP, the 3D crosstalk in which the images of neighboring view areas overlap is generated.

The luminance unevenness is recognized as a bright line or a dark line when a viewer views a stereoscopic image while moving, which hinders viewing of a normal stereoscopic image. Therefore, in the lenticular lens type autostereoscopic 3D display, it is necessary to supplement the design so that the uniform luminance can be maintained, even if the viewing position is changed.

SUMMARY

In order to overcome the above mentioned drawbacks, one of the objects of the present disclosure is to provide a lenticular lens type autostereoscopic 3D display in which the luminance uniformity is ensured as the viewing position is moved.

In order to accomplish the above object and other objects, the present disclosure provides an autostereoscopic 3D display comprising: a display panel including a plurality of pixels, and an aperture area disposed at each pixel; and a lens film disposed on a front surface of the display panel and including a plurality of lenticular lens, the lenticular lenses having a slanted angle and continuously arrayed along to a lateral direction, wherein the aperture area includes: at least two sub-aperture areas; a central black strip disposed between two neighboring sub-aperture areas; and side black strips disposed at a left side and a right side of the aperture area, respectively.

In one embodiment, each of the at least two sub-aperture areas has a parallelogram shape having a same size.

In one embodiment, the tilt axis of the lenticular lens is parallel to any one of diagonal lines of the at least two sub-aperture areas.

In one embodiment, the tilt axis is parallel to a first diagonal line connecting an upper-right corner point and a lower-left corner point of one of the at least two sub-aperture areas.

In one embodiment, the tilt axis is parallel to a second diagonal line connecting an upper-left corner point and a lower-right corner point of one of the at least two sub-aperture areas.

In one embodiment, the central black strip has a first width, and the side black strips have a second width corresponding to half of the first width.

In one embodiment, the first width is in the range of 1 μm to 3 μm when a manufacturing process tolerance is 2 μm.

In one embodiment, the central black strip is parallel to the side black strip.

The present disclosure provides a lenticular lens type autostereoscopic 3D display in which the aperture area disposed within the view area of the lenticular lens is divided into two sub-aperture areas at least, and a central black strip is inserted between two neighboring sub-aperture areas. Further, side black strips are inserted at a left side and a right side of the aperture area. Especially, the central black strip has a width corresponding to the manufacturing process tolerance, and the side black strips have a width corresponding to half of the width of the central black strip. As a result, the black lines exist between the sub-aperture areas. As the black line has the same width as the dark line due to the manufacturing process tolerance, the luminance reduction is uniformly distributed over the whole display area. As a result, when observing the stereoscopic image while moving across the entire view area, the luminance variation hardly occurs. The lenticular lens type autostereoscopic 3D display according to the present disclosure provides a natural stereoscopic image because the luminance of the stereoscopic image does not change greatly even when the viewer moves across the view area.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION OF THE EMBODIMENTS

Figure 1:
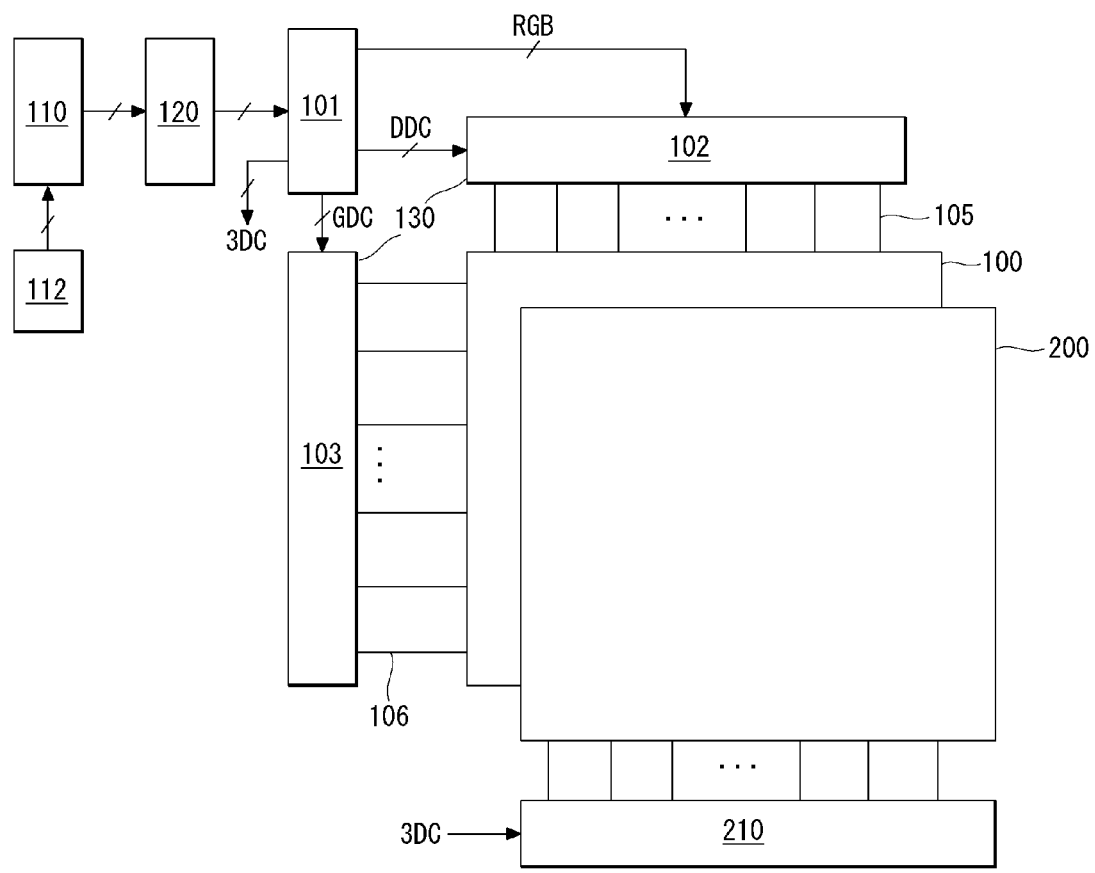
FIG. 1 is a schematic diagram illustrating the autostereoscopic 3D display according to the related art.

Hereinafter, various embodiments according to the present disclosure will be described in detail with reference to the accompanying drawings. Like reference numerals throughout the specification denote substantially identical components. In the following description, a detailed description of known functions and configurations incorporated herein may be omitted when it may make the subject matter of the present invention rather unclear. In addition, the component names used in the following description may be selected in consideration of easiness for explanation, and may be different from the parts names of actual products. The present disclosure is not restricted by these embodiments but can be applied to various changes or modifications without changing the technical spirit.

First Embodiment

Figure 5:
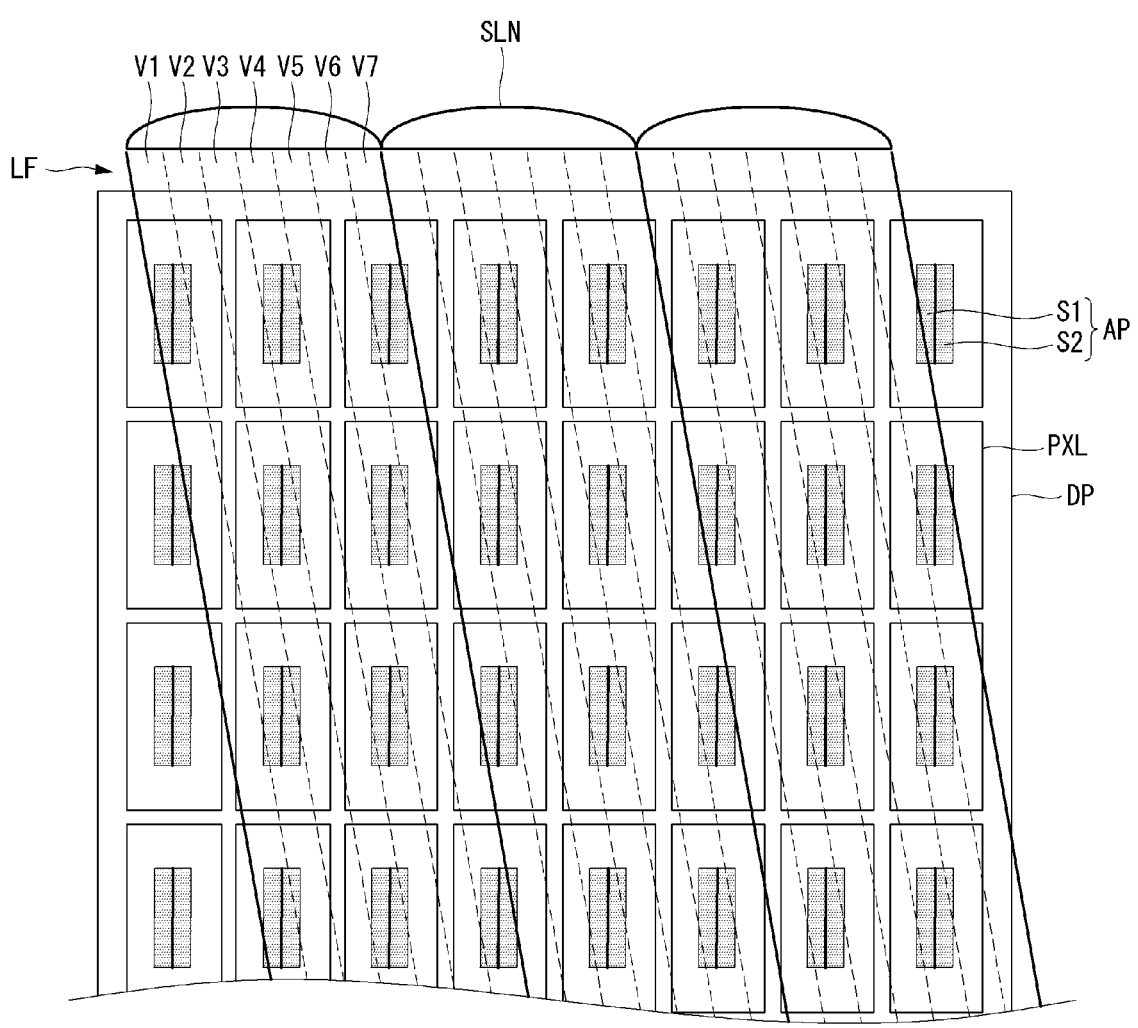
FIG. 5 is a plan view illustrating a lenticular lens type autostereoscopic 3D display according to the first embodiment of the present disclosure.

Hereinafter, referring to FIG. 5, the first embodiment of the present disclosure will be explained. FIG. 5 is a plan view illustrating a lenticular lens type autostereoscopic 3D display according to the first embodiment of the present disclosure.

Referring to FIG. 5, the lenticular lens type autostereoscopic 3D display according to the first embodiment of the present disclosure comprises a display panel 100 and a lens film LF disposed on the upper surface of the display panel 100. The display panel 100 includes a plurality of the pixels PXL arranged in a matrix manner. Further, the display panel 100 includes various elements for driving the pixels PXL. Each pixel PXL includes one aperture area AP.

The lens film LF includes a plurality of semi-cylindrical lenticular lenses SLN arranged in succession. The lenticular lenses SLN may be attached to the upper surface of the display panel 100 with a predetermined inclination. Here, the inclination can be expressed in unit of pixel PXL. For example, in the case of a ⅓ delta structure, the inclination of the lenticular lens SLN may be equal to (the width of the pixel)/(3×the vertical length of the pixel). Here, the delta value can be set to n/m (n is a natural number, and m is a natural number larger than n).

The lenticular lens may be divided into k view areas. The division of the view area is determined by the design method. Here, concrete methods for dividing (or separating) the view areas not directly related to the present invention are not mentioned. In FIG. 5, 7 view areas are shown as an example only. Each of the pixels allocated to the view areas V1 to V7 represent a unique screen. Therefore, the display device shown in FIG. 5 simultaneously displays 7 images viewed from 7 directions. However, 7 images are divided into 7 view areas by the lenticular lens to be provided. The number of view areas is not limited to 7, and the number of view areas can be variously set according to a view map (or view area setting) design.

Figure 6A:
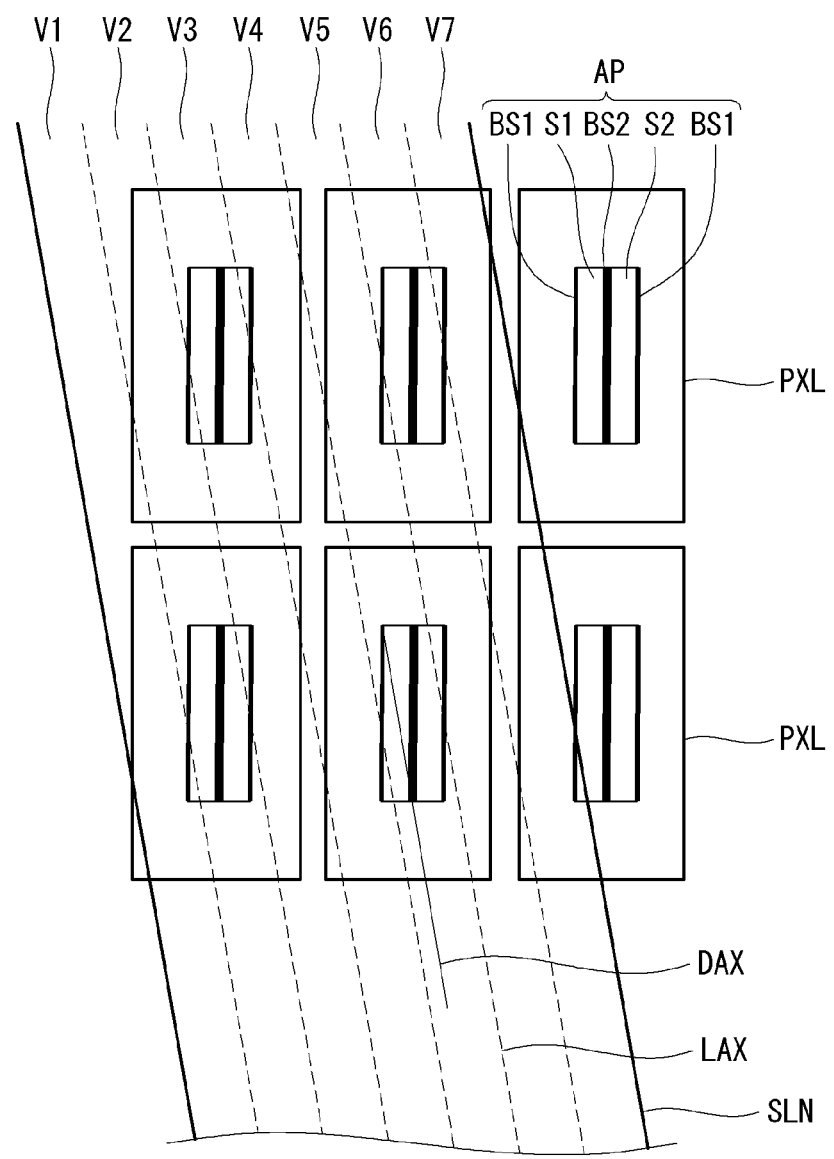
FIG. 6A is an enlarged plan view illustrating the structures of the aperture area and the lenticular lens, according to the first embodiment of the present disclosure.

An embodied feature of the autostereoscopic 3D display according to the present disclosure may reside in the structure of the aperture area AP. There are various embodiments according to the structure of the aperture area AP. In the first embodiment, a case in which the aperture area AP has two sub-aperture areas S1 and S2 with reference to FIG. 6A. FIG. 6A is an enlarged plan view illustrating the relationship between the structures of the aperture area and the structure of the lenticular lens, according to the first embodiment of the present disclosure.

Referring to FIG. 6A, an aperture area AP is defined in each pixel PXL. The aperture area AP has a parallelogram shape. It is preferable that the lateral width of the aperture area AP is equal to the width of the view area defined in the lenticular lens SLN.

In the first embodiment, the aperture area AP according to the present invention is divided into at least two sub-aperture areas, that is, a first sub-aperture area S1 and a second sub-aperture area S2. The first sub-aperture area S1 and the second sub-aperture area S2 may have the same parallelogram shape and their sizes may be equal to each other. Although these two sub-aperture areas do not necessarily have to be the same, it is desirable that they have the same size for convenience of design.

In the second feature, a side black strip BS1 is disposed on the left side and the right side of the aperture area AP, respectively. A central black strip BS2 is arranged between the sub-aperture areas S1 and S2. The side black strip BS1 and the central black strip BS2 are arranged in parallel with each other. These black strips BS1 and BS2 correspond to artificially added dark lines in consideration of process errors or process tolerances.

Figure 4A:
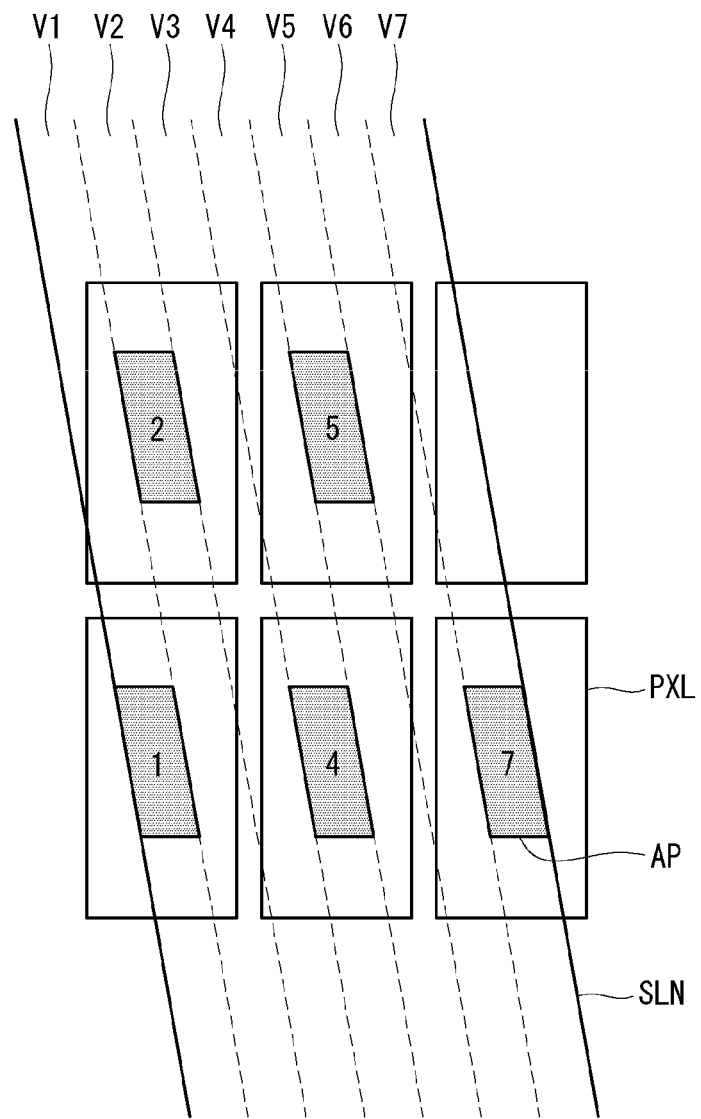
FIGS. 4A to 4C are schematic diagrams for explaining the luminance variation occurrence at the lenticular lens type autostereoscopic 3D display according to the related art.
Figure 4B:
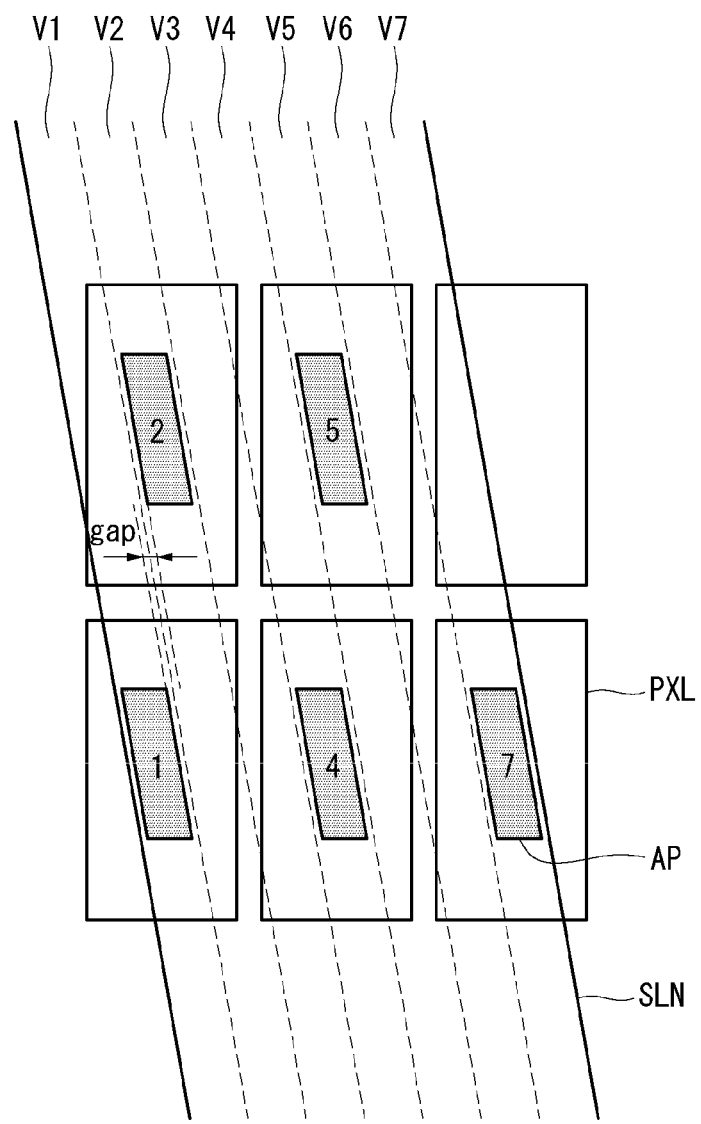
Figure 4C:
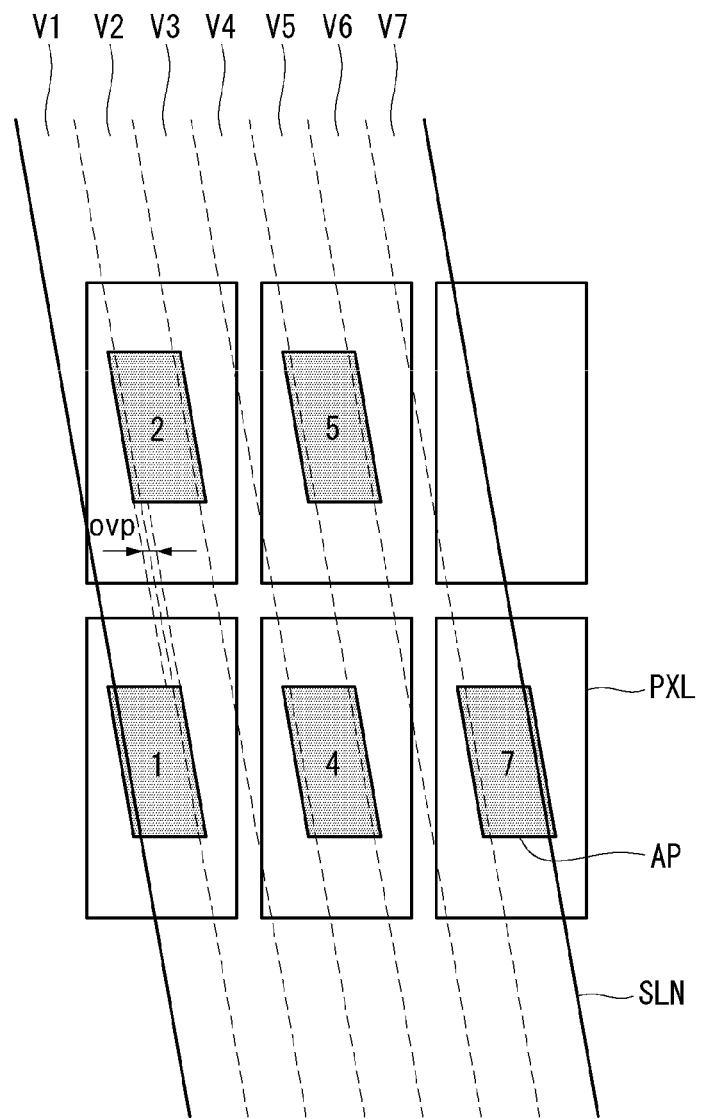

For example, when the line width process tolerance is 2 μm, a width of 2 μm between two neighboring aperture areas AP can be overlapped or spaced from each other, as explained in FIGS. 4A to 4C. In the first embodiment, the deviation range due to this process error is treated as a dark line.

A side black strip BS1 having a width corresponding to half the process error is intentionally added to the inside of the aperture area AP at the left side and the right side of the aperture area AP. A central black strip BS2 having a width corresponding to a process error is added between the sub-aperture areas S1 and S2. Thus, the dark line inserted between two neighboring aperture areas AP and the dark line inserted into the aperture area AP can have the same width. By providing the above-described side black strips and central black strip in the aperture area AP, a structure for preventing a luminance difference from occurring at the boundary of the view area or inside the view area can be formed. That is, even if an error occurs within a process error, the lenticular lens type autostereoscopic 3D display according to the present disclosure provides a robust structure in which the luminance difference is not substantially generated.

For example, if the manufacturing process error or tolerance is 2 μm the width of the side black strip BS1 may be set to 1 μm and the width of the central black strip BS2 may be set to 2 μm. In another case, if the manufacturing process error or tolerance is 1 μm, the width of the side black strip BS1 may be set to 0.5 μm and the width of the central black strip BS2 may be set to 1 μm.

Figure 6B:
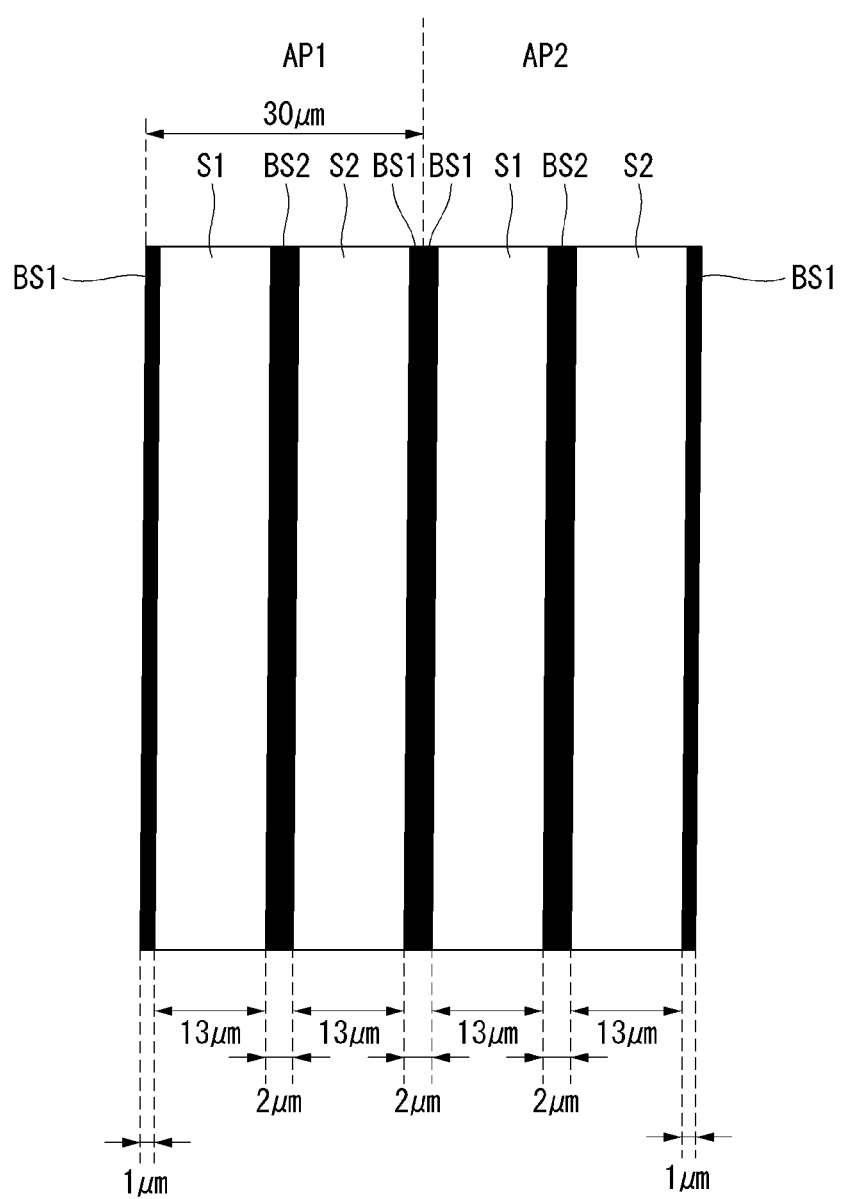
FIG. 6B is a plan view describing the robust structure for eliminating the luminance difference between two neighboring view areas in the lenticular lens type autostereoscopic 3D display according to the first embodiment of the present disclosure.

A more detailed description will be given with reference to FIG. 6B. FIG. 6B is a diagram for explaining a robust structure for eliminating luminance deviation between neighboring view areas in a lenticular lens type autostereoscopic 3D display according to the first embodiment of the present disclosure.

FIG. 6B is a virtual view for explaining two aperture areas arranged in two neighboring view areas, by virtually arranging two aperture areas side by side. In FIG. 6B, the first aperture area AP1 in the first view area and the second aperture area AP2 in the second view area are arranged in parallel with each other. Here, the width of each of the aperture areas AP1 and AP2 is set to 30 μm, and the manufacturing process error or tolerance is set to 2 μm.

In this case, in each of the aperture areas AP1 and AP2, a side black strip BS1 having a width of 1 μm in inward from the left side and the right side is disposed. For example, the side black strip BS1 has the width of 1 μm from the edge side into the aperture area AP1 or AP2. A central black strip BS2 having a width of 2 μm in is disposed in each of the aperture areas AP1 and AP2. Then, the first sub-aperture area S1 and the second sub-aperture area S2 each have a width of 13 μm.

In this structure, a set of the first sub-aperture area S1 and the second sub-aperture area S2 are arrayed along to the horizontal (or lateral) direction. Specifically, every sub-aperture area having the width of 13 μm is arrayed with the black strip having the width of 2 μm. Therefore, when a person observes the autostereoscopic 3D display according to the first embodiment as moving from one side to the other side, he/her may see a superior stereoscopic image without any luminance difference.

In a third feature, there is a relationship between the sub-aperture areas S1 and S2 and the tilted axis of the lenticular lens SLN. It is preferable that the tilt axis of the lenticular lens SLN coincides with one of the diagonal lines of the sub-aperture areas S1 and S2. In FIG. 6A, the dotted lines inside of the lenticular lens SLN are virtual lines for distinguishing the view areas. This imaginary dotted line is parallel to the tilt axis LAX of the lenticular lens SLN. Therefore, it is preferable that the tilt axis LAX is parallel to the diagonal axis DAX connecting the upper left vertex and the lower right vertex of the sub-aperture area S1 or S2.

As a result of forming and arranging the aperture area AP and the lenticular lens SLN so as to satisfy the above three features, it was possible to obtain a very excellent result in which the luminance deviation dropped sharply to less than 2% even when the viewing position was changed. The fact that the luminance deviation is decreased means that the autostereoscopic 3D display according to the present disclosure can provide superior video quality in which the luminance deviation does not occur.

The cause of the luminance deviation between the neighboring aperture areas is due to the process deviation. The luminance deviation occurs between the neighboring two aperture areas due to a process error. In the present disclosure, one aperture area AP is divided into two or more sub-aperture areas, and a central black strip BS2 having a width corresponding to the process error is added between two sub-aperture areas S1 and S2. And, a side black strip BS1 having a width corresponding to half of the manufacturing process deviation is added to the left side and the right side of the aperture area AP. Further, the diagonal axis DAX of the sub-aperture areas (S1, S2) is set to be parallel to the tilt axis LAX of the lenticular lens SLN so that each view area has the same area distribution and crosses the dark line.

Figure 2:
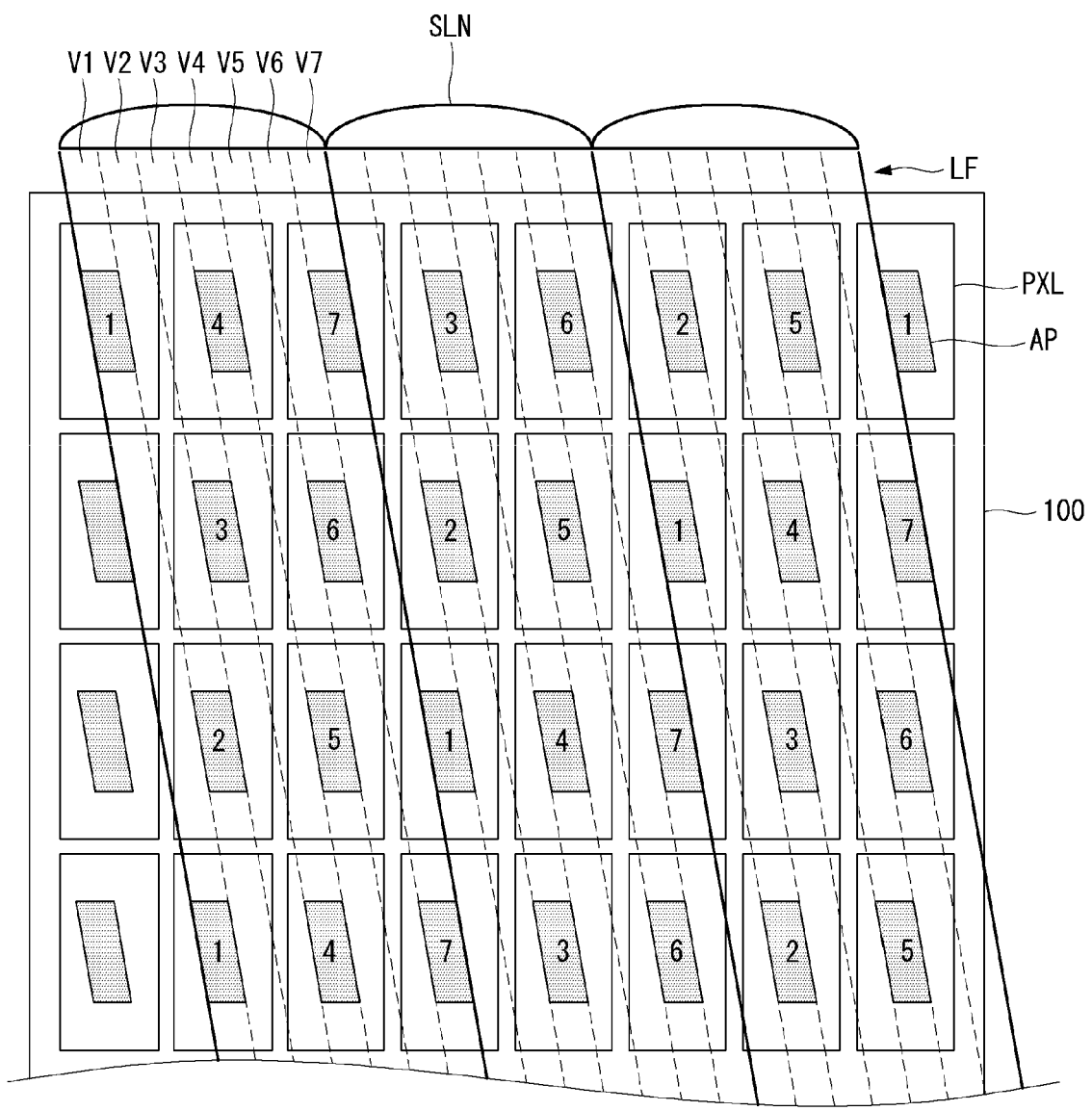
FIG. 2 is a plan view illustrating the structure of a lenticular lens type autostereoscopic 3D display according to the related art.
Figure 3A:
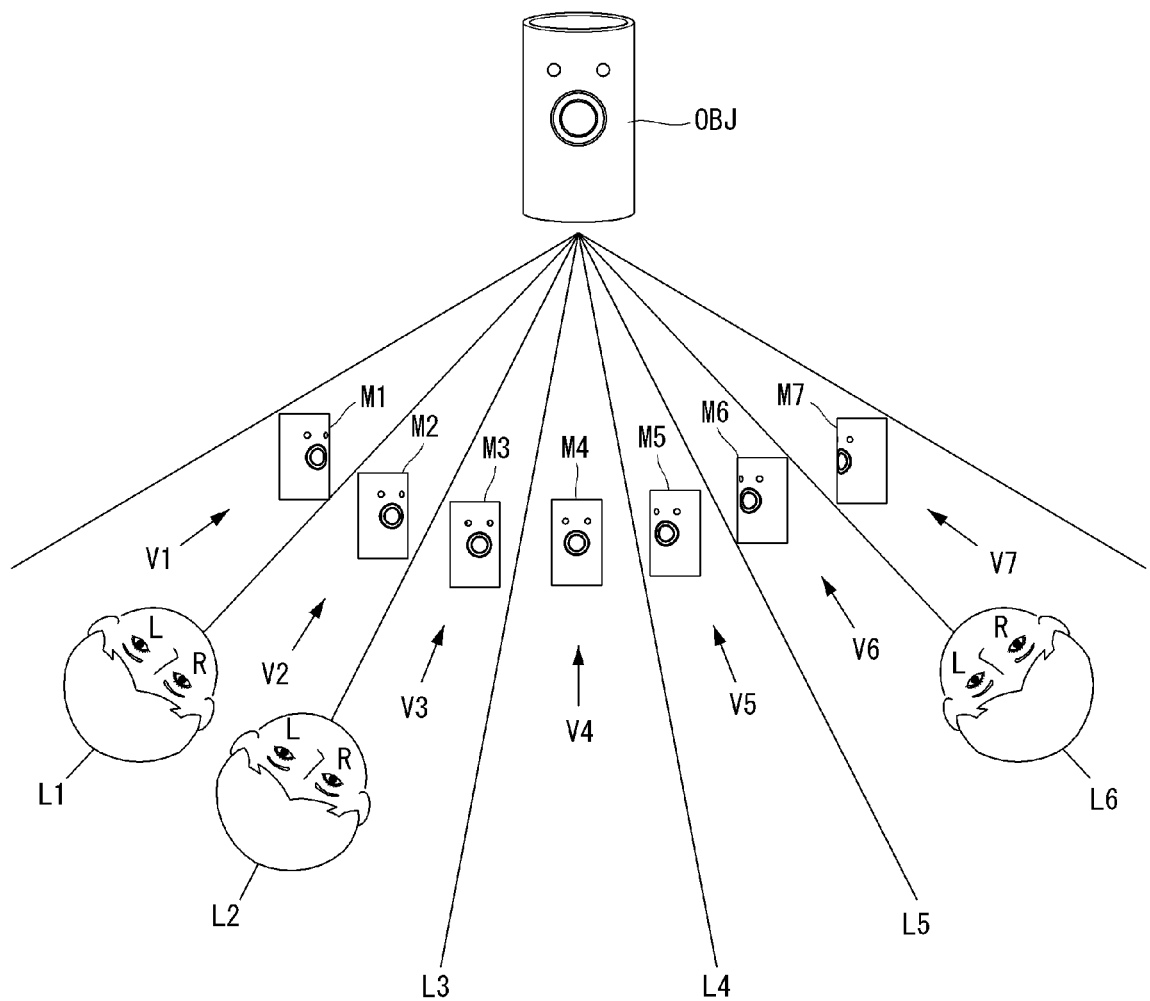
FIGS. 3A and 3B are schematic diagrams illustrating a mechanism for displaying an object as a stereoscopic image.
Figure 3B:
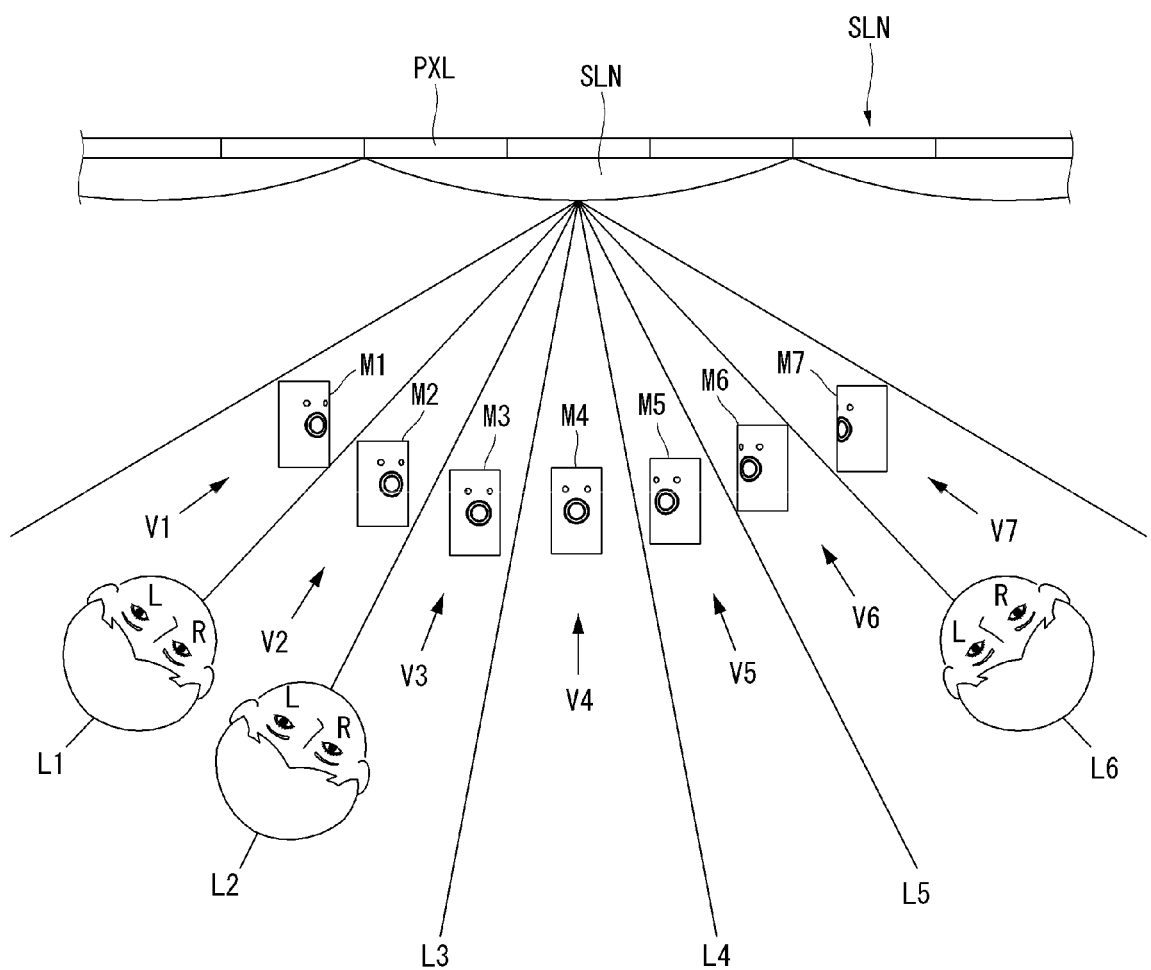

For reference, in the autostereoscopic 3D display shown in FIG. 2 according to the related art, the luminance deviation caused by the manufacturing process deviation is measured at the lowest of about 29.9%. In the structure according to the related arts, the luminance deviation cannot be reduced to 20% or less even if the process deviation is reduced. On the contrary, in the autostereoscopic 3D display shown in FIG. 6A according to the first embodiment of the present disclosure, the luminance deviation was remarkably improved to 1.76%.

When the diagonal axis DAX of the sub-aperture area S1 or S2 is made parallel to the tilt axis LAX of the lenticular lens SLN as in the first embodiment, a part of the aperture area AP allocated to a certain view area overlaps with a neighboring view area. This part is the overlapping of two view areas, which can cause 3D crosstalk.

In order to reduce the 3D crosstalk, there is a method of reducing the size of the aperture area AP so that the aperture area AP is enclosed into one view area. In this case, although the 3D crosstalk can be eliminated, the size of the aperture area AP may become too small, and the overall luminance may be degraded.

In order to prevent the high luminance from lowering, there is a plan to take some degree of 3D crosstalk. For example, if the areas causing the 3D crosstalk occupy less than 50% of the view area, no luminance degradation occurs, and the 3D crosstalk does not hinder the viewing of a normal stereoscopic image. That is, it is preferable to adjust the size of the aperture area AP in which the total area outside the view area in the aperture area AP is less than 50% of the aperture area AP allocated in any one view area.

Second Embodiment

Figure 7:
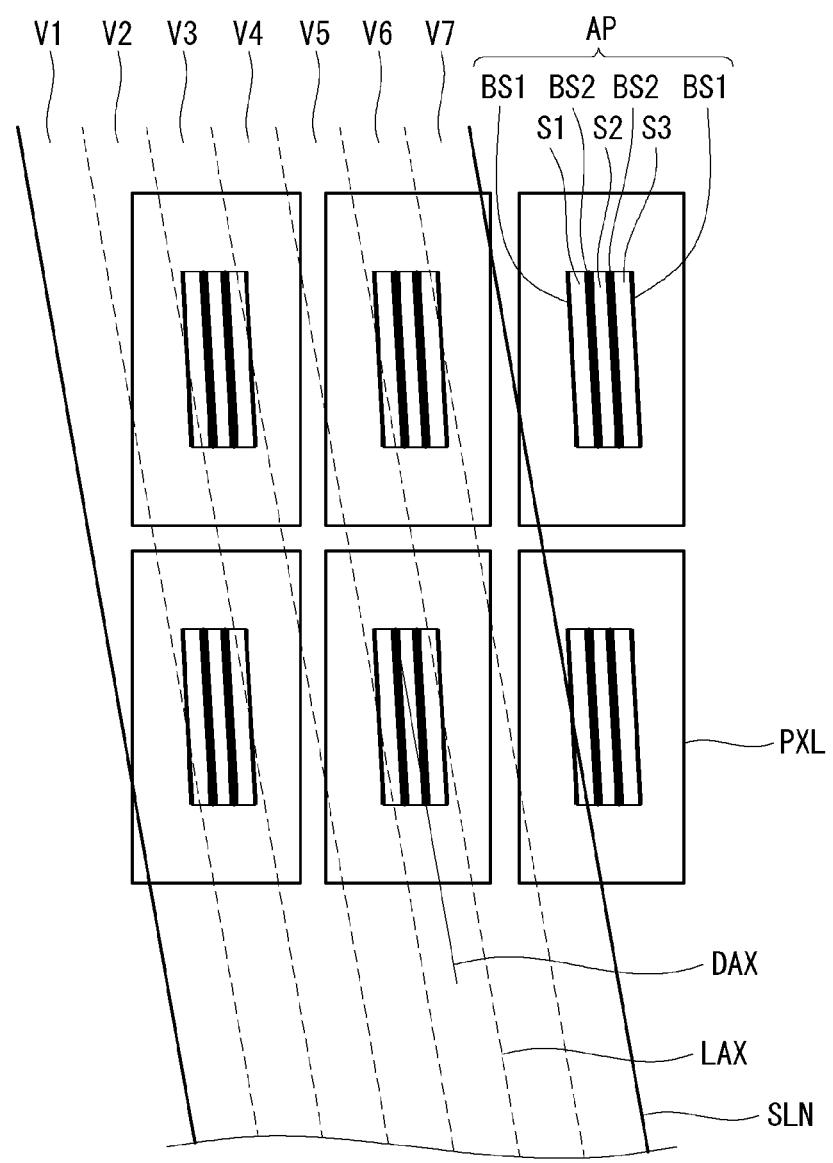
FIG. 7 is an enlarged plan view illustrating a relationship between the structure of an aperture and the structure of the lenticular lens, according to the second embodiment of the present disclosure.

Hereinafter, a second embodiment of the present invention will be described with reference to FIG. 7. FIG. 7 is an enlarged plan view illustrating a relationship between the structure of the aperture area and the structure of the lenticular lens, according to the second embodiment of the present disclosure. In the following description of the embodiments, the relationship between the aperture area and the lenticular lens will be described.

Referring to FIG. 7, an aperture area AP is defined in the pixel PXL. The aperture area AP has a parallelogram shape. It is preferable that the lateral width of the aperture area AP is equal to the width of the view area set in the lenticular lens SLN. The aperture area AP includes three sub-aperture areas, namely, a first sub-aperture area S1, a second sub-aperture area S2 and a third sub-aperture area S3. It is preferable that the first sub-aperture area S1 to the third sub-aperture area S3 have a parallelogram shape having the same size as each other.

A side black strip BS1 is disposed on the left side and the right side of the aperture area AP, respectively. One central black strip BS2 is arranged between the sub-apertures S1, S2 and S3. The side black strip BS1 and the central black strip BS2 are arranged in parallel with each other. These black strips BS1 and BS2 correspond to artificially added dark lines in consideration of the manufacturing process tolerance.

At the left side and the right side of the aperture area AP, a side black strip BS1 having a width corresponding to half of the manufacturing process tolerance is disposed inside the aperture area AP, respectively. Between the sub-aperture areas S1, S2 and S3, central black strips BS2 each having a width corresponding to the manufacturing process tolerance are disposed one by one. As the results, the same dark lines are disposed between two neighboring aperture areas AP and inside of any one aperture area AP with same distance. The luminance difference is not occurred between the two neighboring aperture areas AP as well as the inside of the aperture area AP. That is, even if the manufacturing process tolerance is affected to the manufactured shapes of the aperture areas, the lenticular lens type autostereoscopic 3D display according to the present disclosure has the robust structure in which the luminance difference is not occurred.

For example, when the manufacturing process tolerance is 2 µm the width of the side black strip BS1 can be set to 1 and the width of the central black strip BS2 can be set to 2 µm. On the other hand, when the manufacturing process tolerance is 1 µm the width of the side black strip BS1 can be set to 0.5 µm and the width of the central black strip BS2 can be set to 1 µm.

It is preferable that the tilt axis LAX of the lenticular lens SLN coincides with one of the diagonal lines of the sub-aperture areas S1, S2 and S3. In FIG. 7, the dotted lines inside of the lenticular lens SLN are the imaginary lines for distinguishing between the view areas. These imaginary dotted lines are parallel to the tilt axis LAX of the lenticular lens SLN. Therefore, it is preferable that the tilt axis LAX is parallel to the diagonal axis DAX connecting the upper left vertex and the lower right vertex of the sub-aperture areas S1, S2 and S3.

The difference between the first embodiment and the second embodiment lies in the number of the sub-aperture areas. In the first embodiment, the sub-aperture areas of one aperture area are two. In the second embodiment, the sub-aperture areas of one aperture area are three. Comparing FIG. 6 with FIG. 7, as the number of the sub-aperture areas increases, the shape of the aperture area AP becomes closer to the rectangular shape.

However, if the number of the sub-aperture areas increases, the number of the central black strips BS2 increases. The central black strip BS2 corresponds to an artificially added black line. Therefore, if the number of the central black strips BS2 becomes too large, the overall luminance of the whole display panel is greatly lowered. In the present disclosure, the most preferable result is obtained when the number of the sub-aperture areas is two or three.

Third Embodiment

Figure 8:
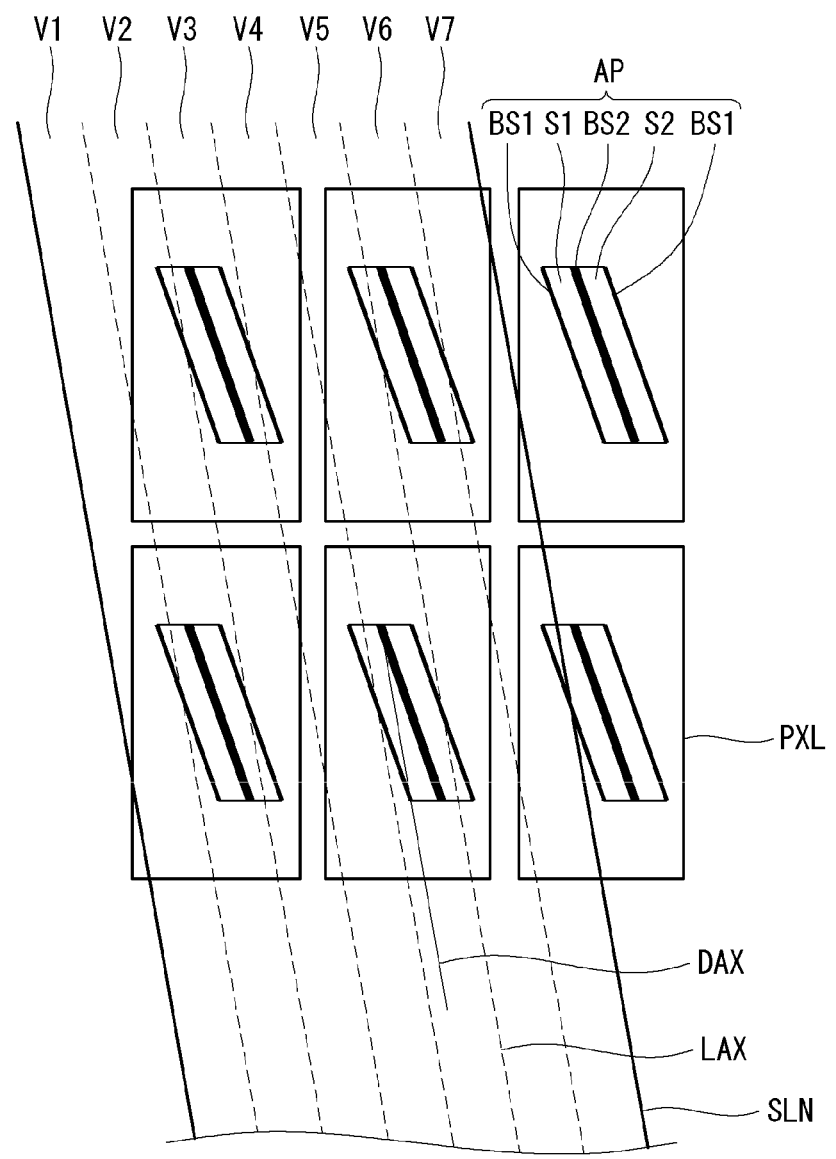
FIG. 8 is an enlarged plan view illustrating a relationship between the structure of an aperture and the structure of the lenticular lens, according to the second embodiment of the present disclosure.

Hereinafter, a third embodiment of the present invention will be described with reference to FIG. 8. FIG. 8 is an enlarged plan view illustrating a relationship between the structure of the aperture area and the structure of the lenticular lens, according to the third embodiment of the present disclosure.

Referring to FIG. 8, one aperture area AP is defined in one pixel PXL. The aperture area AP has a parallelogram shape. It is preferable that the lateral width of the aperture area AP is equal to the width of the view area set in the lenticular lens SLN. The aperture area AP is divided into two sub-aperture areas, namely, a first sub-aperture area S1 and a second sub-aperture area S2. The first sub-aperture area S1 and the second sub-aperture area S2 may have the same parallelogram shape and their sizes may be equal to each other. Although these two sub-aperture areas do not necessarily have to be the same, it is desirable that they have the same size for convenience of design.

A side black strip BS1 is disposed on the left side and the right side of the aperture area AP, respectively. And, a central black strip BS2 is arranged between sub-apertures S1 and S2. The side black strip BS1 and the central black strip BS2 are arranged in parallel with each other. These black strips BS1 and BS2 correspond to artificially added dark lines in consideration of process errors.

It is preferable that the side black strips BS1 disposed at each lateral side of the aperture area AP has the width corresponding to half of the manufacturing process tolerance. Further, it is preferable that the central black strip BS2 disposed between two sub-apertures S1 and S2 has the width corresponding to the manufacturing process tolerance. For example, when the manufacturing process tolerance is 2 µm, the width of the side black strip BS1 may be set to 1 µm and the width of the central black strip BS2 may be set to 2 µm. In another case, when the manufacturing process tolerance is 1 µm, the width of the side black strip BS1 may be set to 0.5 µm and the width of the central black strip BS2 may be set to 1 µm.

However, in some cases, the width of the central black strip BS2 may be selected in a range of 1 µm to 3 µm, inclusively, when the manufacturing process tolerance is 2 µm. In those cases, it is preferable that the side black strip BS1 has the width corresponding to half width of the central black strip BS2.

It is preferable that the tilt axis LAX of the lenticular lens SLN is parallel to or corresponding to any one of the diagonal lines of the sub-aperture areas S1 and S2. In FIG. 8, the dotted lines inside of the lenticular lens SLN are the imaginary lines for distinguishing between the view areas. These imaginary dotted lines are parallel to the tilt axis LAX of the lenticular lens SLN. Therefore, it is preferable that the tilt line LAX is parallel to the diagonal axis DAX connecting the upper right corner and the upper right corner of the sub-aperture area S1 or S2.

Fourth Embodiment

Figure 9:
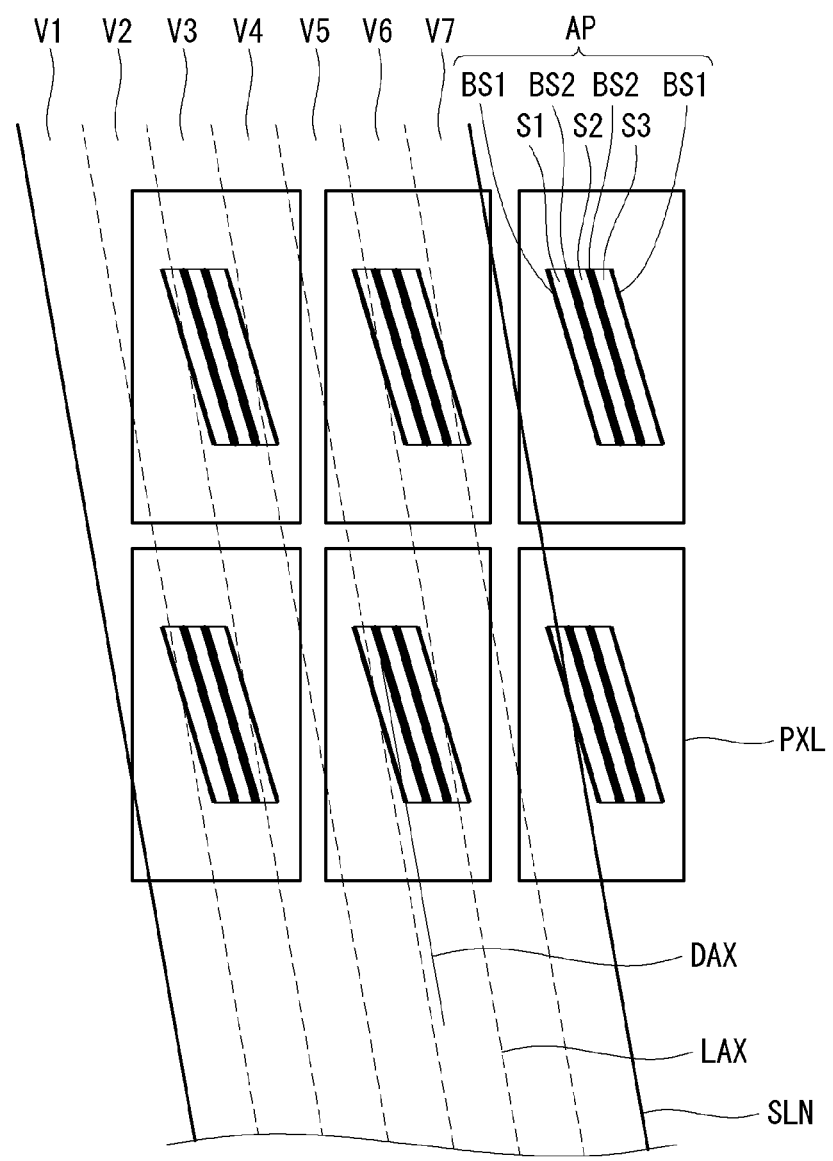
FIG. 9 is an enlarged plan view illustrating a relationship between the structure of an aperture and the structure of the lenticular lens, according to the fourth embodiment of the present disclosure.

Hereinafter, a fourth embodiment of the present disclosure will be described with reference to FIG. 9. FIG. 9 is an enlarged plan view illustrating a relationship between the structure of the aperture area and the structure of the lenticular lens, according to the fourth embodiment of the present disclosure.

Referring to FIG. 9, an aperture area AP is defined in one pixel PXL. It is preferable that the lateral width of the aperture area AP is equal to the width of the view area set in the lenticular lens SLN. The aperture area AP includes three sub-aperture areas: a first sub-aperture area S1, a second sub-aperture area S2 and a third sub-aperture area S3. The aperture area AP has a parallelogram shape. Therefore, it is preferable that the first sub-aperture area S1, the second sub-aperture area S2 and the third sub-aperture area S3 have a parallelogram shape having the same size as each other.

The left side and the right side of one aperture area SP have a side black strip BS1, respectively. One central black strip BS2 is disposed each boundary between sub-apertures S1, S2 and S3. The side black strip BS1 and the central black strip BS2 are arranged in parallel with each other. These black strips BS1 and BS2 correspond to artificially added dark lines in consideration of process errors.

It is preferable that the width of the central black strip BS2 disposed between two sub-apertures S1 and S2 or S2 and S3 is substantially equal to the manufacturing process tolerance. On the other hand, it is preferable that the width of the side black strip BS1 disposed on the left side and the right side of the aperture area AP corresponds to half of the width of the central black strip BS2. For example, when the manufacturing process tolerance is 2 µm the width of the central black strip BS2 may be selected in a range of 1 µm to 3 µm. Specifically, it is preferable that the width of the central black strip BS2 is 2 µm, which is equal to the manufacturing process tolerance, and the width of the side black strip BS1 is 1 µm. In another case, when the manufacturing process tolerance is 1 µm, the width of the side black strip BS1 may be 0.5 µm and the width of the central black strip BS2 may be 1 µm.

It is preferable that the tilt axis LAX of the lenticular lens SLN coincides with one of the diagonal lines of the sub-aperture area S1, S2 or S3. In FIG. 9, the dotted lines inside of the lenticular lens SLN are the imaginary lines for distinguishing between the view areas. These dotted lines are parallel to the tilt axis LAX of the lenticular lens SLN. It is preferable that the tilt axis LAX is parallel to the diagonal axis DAX connecting the upper right corner point and lower left corner point of the sub-aperture area S1, S2 or S3.

The difference between the third embodiment and the fourth embodiment lies in the number of the sub-aperture areas. In the third embodiment, there are two sub-aperture areas, whereas in the fourth embodiment, there are three sub-aperture areas. Comparing FIG. 8 with FIG. 9, it can be seen that as the number of sub-aperture areas increases, the inclination of the aperture area AP converges on the tilt axis LAX of the lenticular lens SLN.

However, if the number of the sub-aperture areas becomes too large, the number of the central black strips BS2 also increases. The central black strip BS2 corresponds to an artificially added black line. Therefore, if the number of the central black strips BS2 becomes too large, there arises a problem that the overall luminance is lowered. In the present disclosure, it is preferable that the numbers of the sub-aperture areas are two or three.

While the embodiment of the present disclosure has been described in detail with reference to the drawings, it will be understood by those skilled in the art that the disclosure can be implemented in other specific forms without changing the technical spirit or essential features of the disclosure. Therefore, it should be noted that the forgoing embodiments are merely illustrative in all aspects and are not to be construed as limiting the disclosure. The scope of the disclosure is defined by the appended claims rather than the detailed description of the disclosure. All changes or modifications or their equivalents made within the meanings and scope of the claims should be construed as falling within the scope of the disclosure.

What is claimed is:

1. An autostereoscopic three-dimensional (3D) display, comprising:
    a display panel including a plurality of pixels, each pixel including a physical aperture area having at least two sub-aperture areas, and the physical aperture area having an area smaller than each pixel; and
    a lens film disposed on a front surface of the display panel and including a plurality of lenticular lenses,
    wherein each of the plurality of lenticular lenses has a slanted angle inclined at a predetermined angle with respect to a vertical axis of the display panel and is continuously arranged in a lateral direction, and
    wherein the physical aperture area includes:
        a central black strip disposed between two neighboring sub-aperture areas; and
        a side black strip disposed at a left side and a right side of the physical aperture area, respectively,
    wherein the central black strip has a first width, and the side black strip has a second width corresponding to half of the first width,
    wherein the first width of the central black strip is substantially equal to a manufacturing process tolerance,
    wherein each of the plurality of lenticular lenses has a plurality of view areas, and
    wherein a lateral width of the physical aperture area is same that of the view areas defined in the lenticular lenses.

2. The display according to claim 1, wherein each of the at least two sub-aperture areas has a parallelogram shape having a same size.

3. The display according to claim 1, wherein the slanted angle is parallel to a first diagonal line connecting an upper-right corner point and a lower-left corner point of the at least two sub-aperture areas.

4. The display according to claim 1, wherein the slanted angle is parallel to a second diagonal axis connecting an upper-left corner and a lower-right corner point of one of the at least two sub-aperture areas.

5. The display according to claim 1, wherein the first width has a value of 1 µm to 3 µm when the manufacturing process tolerance in a process of manufacturing the display panel is 2 µm.

6. The display according to claim 1, wherein the central black strip is parallel to the side black strip.

7. The display according to claim 1, wherein a portion of one aperture area allocated to one view area of a plurality of view areas divided by the plurality of lenticular lenses is overlapped with another aperture area allocated to another view area neighboring the one view area, and the portion of the physical aperture area outside the one view area is less than 50% of the one view area.

8. The display according to claim 1, wherein the slanted angle is determined by ('n'×a width of the pixel)/('m'×a length of the pixel), 'n' being a natural number, and 'm' being a natural number larger than 'n'.

9. An autostereoscopic three-dimensional (3D) display, comprising:
    a display panel including a plurality of pixels, each pixel having a physical aperture area including at least two sub-aperture areas disposed to have an area smaller than the each pixel at the each pixel; and
    a lens film disposed on the display panel and including a plurality of lenticular lenses continuously arranged with a tilt axis inclined at a predetermined angle with respect to a vertical axis of the display panel, wherein the physical aperture area includes:
a central black strip having a first width and disposed between two neighboring sub-aperture areas; and
a side black strip having a second width and disposed at a left side and a right side of the physical aperture area, respectively, wherein the second width corresponds to half of the first width, wherein the first width of the central black strip is substantially equal to a manufacturing process tolerance, wherein each of the plurality of lenticular lenses has a plurality of view areas, and wherein a lateral width of the physical aperture area is same that of the view areas defined in the lenticular lenses.

10. The display according to claim 9, wherein the at least two sub-aperture areas include a first sub-aperture area and a second sub-aperture area with a first central black strip disposed therebetween.

11. The display according to claim 10, wherein the at least two sub-aperture areas further include a third sub-aperture area disposed next to the second sub-aperture area with a second central black strip disposed therebetween.

12. The display according to claim 9, wherein each of the at least two sub-aperture areas has a parallelogram shape having a same size.

13. The display according to claim 9, wherein the tilt axis is parallel to one of diagonal lines of the at least two sub-aperture areas.

14. The display according to claim 9, wherein the tilt axis is parallel to a first diagonal line connecting an upper-right corner point and a lower-left corner point of one of the at least two sub-aperture areas.

15. The display according to claim 9, wherein the tilt axis is parallel to a second diagonal line connecting an upper-left corner point and a lower-right corner point of one of the at least two sub-aperture areas.

16. The display according to claim 9, wherein the first width has a value of 1 μm to 3 μm when the manufacturing process tolerance in a process of manufacturing the display panel is 2 μm.

17. The display according to claim 9, wherein the central black strip is parallel to the side black strip.

18. The display according to claim 9, wherein a portion of one aperture area allocated to one view area of a plurality of view areas divided by the plurality of lenticular lenses is overlapped with another aperture area allocated to another view area neighboring the one view area, and the portion of the physical aperture area outside the one view area is less than 50% of the one view area.

19. The display according to claim 9, wherein the slanted angle is determined by ('n'×a width of the pixel)/('m'×a length of the pixel), 'n' being a natural number, and 'm' being a natural number larger than 'n'.

* * * * *